United States Patent [19]

Kaae et al.

[11] 4,267,019

[45] May 12, 1981

[54] NUCLEAR FUEL PARTICLES

[75] Inventors: James L. Kaae, Solana Beach, Calif.; George H. Reynolds, Houston, Tex.; Stewart A. Sterling, San Diego; Ling Yang, La Jolla, both of Calif.

[73] Assignee: General Atomic Company, San Diego, Calif.

[21] Appl. No.: 904,518

[22] Filed: May 10, 1978

[51] Int. Cl.² .................................................. G21C 3/06
[52] U.S. Cl. .................................... 176/82; 176/91 SP
[58] Field of Search ...................... 176/82, 91 SP, 91 R

[56] References Cited

U.S. PATENT DOCUMENTS

| | | | |
|---|---|---|---|
| 3,249,509 | 5/1966 | Blocher, Jr. | 176/91 SP |
| 3,325,363 | 6/1967 | Goeddel et al. | 176/91 SP |
| 3,350,274 | 10/1967 | Higatsberger | 176/91 R |
| 3,354,043 | 11/1967 | Boettcher | 176/91 R |
| 3,361,638 | 1/1968 | Bokros et al. | 176/91 SP |
| 3,764,469 | 10/1973 | Bokros et al. | 176/91 SP |
| 3,799,790 | 3/1976 | Schulz et al. | 176/82 |
| 3,878,041 | 4/1975 | Leitnaker et al. | 176/82 |
| 4,022,660 | 5/1977 | Johnson et al. | 176/91 SP |

FOREIGN PATENT DOCUMENTS 933500  8/1963  United Kingdom ................ 176/91 SP

OTHER PUBLICATIONS

"Reactor Materials", vol. 6, No. 2, 5/63, pp. 1,2,6–10, Oxley.

*Primary Examiner*—Harvey E. Behrend
*Attorney, Agent, or Firm*—Fitch, Even, Tabin, Flannery & Welsh

[57] ABSTRACT

Coated nuclear fuel particles are made by first pyrolytically depositing low density carbon onto fuel cores and thereafter depositing a fission-product retentive, higher density exterior coating. In the improvement, cores of uranium, thorium or plutonium oxides are coated by co-depositing silicon carbide or zirconium carbide along with the low density pyrocarbon to create a uniform dispersion. Silicon or zirconium is deposited in an amount equal to at least about one atom for each fission anticipated during the fuel lifetime.

8 Claims, No Drawings

NUCLEAR FUEL PARTICLES

This invention relates to nuclear fuel particles designed for use in high-temperature nuclear reactors and more particularly to particles of this type which employ nuclear fuel cores or kernels in the oxide form surrounded by fission product-retentive outer coatings.

Various types of pyrolytic carbon coatings, particularly those using multiple layers of pyrolytic carbon, often in combination with a metal carbide layer, have been developed to provide better fission product retention in nuclear reactor fuel. An example of a process for making one form of such particles, which have generally become known as BISO particles, is set forth in detail in U. S. Pat. No. 3,291,921, issued to J. C. Bokros et al. on Jan. 17, 1967. Another form of such particles, sometimes referred to as TRISO particles, are described in U. S. Pat. No. 3,649,452, issued Mar. 14, 1972 to Jack Chin et al., and exemplary processes for depositing coatings to produce such particles are set forth in detail in this patent.

These BISO and TRISO particles generally employ a first inner layer of low density, porous pyrolytic carbon adjacent the fuel kernel, which is sometimes referred to as a buffer layer and which is usually between about 80 microns and about 120 microns in thickness. Exterior of this porous pyrolytic carbon layer there will be at least one layer of more dense, usually isotropic pyrolytic carbon. As previously indicated, the TRISO particle will employ a layer of metal carbide, such as silicon carbide or zirconium carbide. Although coatings of this type have proved to be very effective and useful in serving as fission product-retentive coatings for nuclear fuel in the carbide form, some difficulties occur when the nuclear fuel is in the oxide form, which have instigated the search for still improved coating systems.

The testing of nuclear fuel kernels in oxide form in the environment of high-temperature nuclear reactors has shown that these kernels undergo thermal migration, sometimes referred to as the amoeba effect, wherein the kernels of nuclear fuel material move very slowly through the buffer coating toward the region of highest temperature. In addition, the fissioning of the nuclear fuel oxide materials releases oxygen which then reacts with carbon from the buffer coating to form carbon monoxide. The creation of carbon monoxide together with the natural creation of gaseous fission products often causes a significant pressure build-up within these pressure-tight outer coating layers that function as individual, minute pressure vessels. This increase of pressure within the core region of the particles increases the stress upon the structural coating layers and increases the chance of coating failure. Likewise, the migration of the oxide kernels leads to coating failure as a result of its penetration into the structural coating portion and to the consequent release of the fission products.

Attempts have been made to add metal carbide to the oxide kernels in hopes of both preventing the thermal migration and of chemically gettering the oxygen to alleviate the build-up of carbon monoxide in the core region. However, none of these attempts has proved to be successful, and it has generally been thought necessary to design the structural outer coating layers to have sufficient strength to contain the added pressure that will result from the formation of carbon monoxide in addition to the fission product gases and also to provide a buffer layer of sufficient thickness to prevent kernel contact with the outer dense coating layer during the lifetime of the fuel. Furthermore, the present emphasis on the use of low-enriched uranium fuel in high-temperature reactors has added still greater importance to the ability to inhibit oxide kernel migration, and the potential use of plutonium, which has not been effectively employed in the carbide form, also adds to the importance of solving this problem.

It has now been found that the addition of small amounts of zirconium carbide, silicon carbide or a mixture thereof to the low density buffer layer of coated fuel particles of this type, by employing pyrolytic co-deposition, effectively combats both the amoeba effect of an oxide kernel and the undesirable high-pressure build-up of carbon monoxide. The amount of metal carbide which is added is generally based upon the anticipated amount of oxygen that will be released through fission during the average life of the fuel particle. It is preferred that about one atom of zirconium or silicon is provided for every fission expected in the particle. Pyrolytic co-deposition of metal carbide, preferably zirconium or silicon carbide, provides a thorough and uniform dispersion that not only effectively counteracts build-up of carbon monoxide, but also reduces thermal migration to such an extent that the amoeba effect is no longer of consequence during normal fuel life.

It is believed that oxide kernels which contain uranium oxide, thorium oxide or plutonium oxide or which contain mixtures of these oxides are useful in forming fuel particles in accordance with this invention. The choice of oxide fuel will depend upon the reactor itself, and more than one type of fuel may be used in one reactor core. For example, particles may include about ten parts thorium to one part uranium (by weight) or to one part thorium to two parts uranium.

The kernels will usually be in the form of spheroids between about 100 microns and about 500 microns in diameter, although larger spheroids, e.g., 1000 microns in diameter, may also be used. The oxide materials may be fabricated so as to be in dense form or in porous form, as desired, for a particular reactor core. The porosity of the kernels is not considered to be of particular importance to the performance of the present invention.

Generally, the low density pyrocarbon can be deposited directly upon the oxide cores; however, as pointed out in U.S. Pat. No. 3,649,452, if desired, a seal layer of pyrocarbon of higher density, for example, laminar carbon about 1.7 to 2.2 g/cm$^3$ can be used and will provide a suitable barrier at a thickness as low as one micron—although 3 to 10 microns may be employed. The seal layer is effective during the fabrication process in preventing the conversion of the oxide nuclear fuel materials to carbides during deposition and in preventing possible chemical attack upon the oxide fuel by halogen vapors which are usually present during such a co-deposition operation. Such a seal layer is expected to break early in the irradiation lifetime of the particle.

The low density pyrocarbon layer should not have a density greater than about 60% of theoretical maximum density. The porous carbon may be characterized as very poorly crystalline carbon having a diffuse X-ray diffraction pattern and a density not greater than about 1.3 g/cm$^3$. Such carbon is porous to gaseous materials, and has an ability to attenuate fission recoils and thereby prevent structural damage to the next outermost layer of the pressure-tight shell. The porous carbon layer should have a thickness of at least 20 microns and might be as thick as about 200 microns; however, it is generally contemplated that about 80 to 120 microns of porous carbon will be used in fuel particles of the usual size.

The exterior layers may be of any suitable form to create a satisfactory pressure-tight barrier. For example, as previously indicated, BISO particles may be made by depositing a layer of dense, isotropic pyrolytic carbon at least about 85 microns thick exterior of the low density porous pyrocarbon. On the other hand, TRISO particles may be made by first depositing an intermediate layer of a metal carbide, for example, zirconium carbide, silicon carbide (for purposes of this application, silicon is referred to as a metal) or a mixture thereof, about 20 microns thick, followed by a layer of dense isotropic pyrolytic carbon having for example a density of about 1.95 g/cm$^3$ and a thickness of at least about 50 microns. Suitable conditions for the deposition of these pressure-tight barrier layers are taught in the aforementioned patents.

The low density pyrolytic carbon layer is preferably deposited from a mixture of acetylene and an inert gas, such as argon, in a fluidized bed at about 1100° C. although temperatures between about 900° C. and 1800° C. might be used. The preferred conditions of deposition produce porous pyrocarbon having a density of about 1 g/cm$^3$. It is generally known in the art that porous carbon can be obtained at deposition temperatures in the range of between about 800° C. and about 1800° C. using a suitable gaseous hydrocarbon, preferably acetylene, at a relatively high partial pressure, i.e., between about 0.65 to about 1, with the remainder of the gas stream being an inert gas, such as argon or helium.

The additive substance is co-deposited along with the porous pyrocarbon by including in the gaseous mixture a suitable metal compound which will be vaporous at deposition temperature plus, in some cases, hydrogen. The pyrolytic deposition of silicon carbide or zirconium carbide alone is well known, and the same general principles govern its co-deposition as an additive substance. The very nature of the fluidized bed process assures that there is excellent dispersion of the metal carbide uniformly throughout the pyrocarbon layer.

Generally, the appropriate metal compound is added to the inert or carrier gas stream in an appropriate proportion to assure that the desired weight percent of metal carbide is co-deposited. For example, when it is desired to use silicon carbide, methyltrichlorosilane may be employed. When it is desired to deposit zirconium carbide, zirconium tetrachloride is often used. Methyltrichlorosilane is a colorless liquid, and all or a part of the carrier gas stream may be bubbled through a bath of the liquid which in turn is maintained at a temperature such as to assure that the appropriate amount of the silicon compound is carried to the deposition chamber. Zirconium tetrachloride may be supplied as a powder which is vaporized in the coating furnace, or it may be generated in vapor form by passing a mixture of carrier gas plus chlorine gas over a heated mass of zirconium sponge. It may also be provided by the direct sublimation of solid $ZrCl_4$.

The spheroids under these conditions are uniformly coated by the decomposing acetylene and metal chloride to produce a porous pyrocarbon matrix which contains a uniform, very fine dispersion of the metal carbide, in an amount of between about 2 and about 30 weight percent of the pyrocarbon. In carbon-silicon carbide mixtures co-deposited under such conditions, the average particle size of the silicon carbide is between about 200 and about 1000Å.

For silicon carbide, which forms a protective oxide layer, this small particle size greatly increases the effectiveness of the carbide particles for reacting with carbon monoxide. Carbon-zirconium carbide mixtures formed under these conditions have larger carbide particles, e.g., about 1600Å., but since zirconium oxide does not form a protective layer on zirconium carbide, the particle size is not as important as it is with silicon carbide. Thus, zirconium carbide may have an average particle size up to about one micron.

The presence of the co-deposited silicon or zirconium carbide throughout the porous carbon matrix effectively getters the oxygen that results from the fissioning either directly or by reacting with the carbon monoxide in accordance with the following equation: $2CO + MC \rightarrow MO_2 + 3C$, where M stands for either zirconium or silicon. Moreover, the uniform dispersion of the metal carbide throughout the spongy carbon layer is particularly effective in preventing the thermal migration of the kernel even though the fuel particles are irradiated to a burnup of 60% FIFA (fissions per initial fissile atom).

The following Examples describe several methods for producing coated fuel particles illustrating various advantages of the invention. Although these Examples include the best modes presently contemplated by the inventors carrying out their invention, it should be understood that these Examples are only illustrative and do not constitute limitations upon the invention which is defined solely by the claims which appear at the end of this specification.

EXAMPLE I

Particulate thorium-uranium oxide is prepared having a particle size of about 450 microns which is generally spheroidal in shape. The mixture of thorium and uranium oxide is such that the weight ratio of thorium to uranium is about 10:1. The uranium used contains about 93 percent enrichment. A graphite reaction tube having an internal diameter of about 3 cm. is heated to about 1300° C. while a flow of about 5 liters/min. of argon gas is maintained therethrough. When coating is ready to begin, the argon flow rate is increased to about 10 l./min., and a charge of about 100 grams of the kernels of the thorium-uranium oxide is fed into the top of the reaction tube. The flow of gas upward through the tube is sufficient to levitate the kernels and thus create within the tube a fluidized particle bed. All of the coating operations are carried out at atmospheric pressure.

When the temperature of the fuel particle kernels reaches about 1300° C., a seal coating is applied by adding propylene to the argon so that the propylene constitutes about 10 percent of the gaseous mixture. At 1300° C., a seal layer of pyrocarbon having a density of about 1.9g/cm$^3$ is deposited, and deposition is continued for a sufficient time to deposit a layer about 10 microns thick.

The temperature is then lowered to about 1100° C., and the flow rates are adjusted so as to provide about 4 liters of argon per minute, about 4 liters of acetylene per minute and about 3 grams of zirconium tetrachloride per minute. The zirconium tetrachloride is provided by mixing chlorine with the argon and passing this stream over reactor-grade zirconium sponge which is maintained at about 600° C. in a resistance furnace. The acetylene decomposes and deposits low density porous carbon upon the fluidized bed of kernels. Under these coating conditions, the carbon deposition rate is about 15 microns per minute. The zirconium tetrachloride simultaneously reacts with the decomposing acetylene to provide zirconium carbide and hydrogen chloride, which is carried off with the argon stream. Because the gas streams are mixed with each other prior to entry into the levitating nozzle at the bottom of the coating chamber, the co-deposition results in a uniform and very fine dispersion of zirconium carbide throughout the entire porous carbon layer in an amount of about 25 weight percent ZrC. Coating is continued until a layer of about 100 microns thick is deposited.

A coating layer of pure isotropic pyrocarbon is then deposited to make up a BISO-type coating. The following conditions are used to deposit the isotropic pyrocarbon: a deposition temperature of about 1300° C. and a 2:1:20 volume mixture of $C_3H_6, C_2H_2$ and argon at a total flow rate of about 10 l/min. The pyrocarbon deposition rate will be about 4 $\mu$/min., and its density will be about 1.9 gm/cm$^3$.

Testing of the coated particles is carried out by disposing them in a suitable capsule and subjecting them to neutron irradiation at an average temperature of about 1200° C. During the time of irradiation, the total fast neutron dose is estimated to be about $5 \times 10^{21}$ neutrons/cm$^2$ (using neutrons of energy greater than about 0.18 Mev.). After burn-up of over 60 percent of the original U-235 atoms, no coating failures are apparent, and the fission product retention of the particles is well within acceptable limits.

Post-irradiation annealing is carried out at a temperature of about 1600° C. and under a temperature gradient of about 1000° C./cm. for about 90 days. Examination of the annealed particles shows that the migration of the oxide core was less than about 10 microns, which is considered to be excellent under such conditions. The nuclear fuel particles are considered to be well suited for use in high-temperature nuclear reactors.

EXAMPLE II

Spheroids of 93 percent enriched uranium oxide having an average particle size of about 200 microns are coated in the same manner as the kernels of Example I to provide an initial seal layer about 10 microns thick in the same reaction tube fluidized bed.

The temperature of the bed is then lowered to about 1100° C., and a mixture of 2 liters per minute of argon, 8 liters per minute of acetylene and about 1 gram per minute of methyltrichlorosilane is supplied to the fluidizing nozzle at the bottom of the chamber. In order to supply the methyltrichlorosilane, the argon flow is bubbled through liquid methyltrichlorosilane at a temperature of about 15° C. Under these conditions a similar porous pyrocarbon layer having a carbon density of about 1 g/cm$^3$ is deposited while co-deposited therewith are very fine, uniformly dispersed particles of silicon carbide. Subsequent examination shows that approximately 12 weight percent of silicon carbide is co-deposited, based upon the weight of the porous pyrocarbon. Deposition is continued until a total layer of about 100 microns thick is deposited.

Layers of silicon carbide and pure isotropic carbon are then deposited to make up a TRISO-type coating. Silicon carbide is deposited at a deposition temperature of about 1700° C. and a flow of about 10 l/min. of $H_2$ with about 3.5 gm/min. of $CH_3SiCl_3$ added. The SiC deposition rate will be about 0.2 per/min., and the SiC will have a density of about 3.2 gm/cm$^3$. The SiC layer deposited is about 10 microns thick. Conditions similar to those described in Example I are used to deposit pure isotropic pyrocarbon about 30 microns thick.

The same testing process as described with respect to Example I is carried out, and the results are considered to be fully acceptable. The nuclear fuel particles are accordingly considered to be well suited for use in high-temperature nuclear reactors.

EXAMPLE III

The process of Example I is repeated using kernels of 20% enriched uranium oxide having an average diameter of about 350 microns. After similar deposition of a 10 micron thick seal layer, a spongy pyrocarbon layer about 100 microns thick is deposited under similar conditions, having zirconium carbide present in an amount of about 25 weight percent.

Following conclusion of the deposition of the spongy carbon layer, outer layers of the type used in TRISO coatings are applied as described in Example II.

The particles are slowly cooled to room temperature and then irradiated under the same conditions as described above with respect to Examples I and II.

These TRISO-coated particles are considered to be well suited for use in high-temperature nuclear reactors.

Although the invention has been particularly described with respect to certain preferred embodiments of nuclear reactor particles, it should be understood that modifications and changes as would be obvious to one having the ordinary skill in this art may be made without departing from the scope of this invention. Various features of the invention are set forth in the claims which follow.

What is claimed is:

1. A nuclear fuel particle having a core of nuclear fuel material, a surrounding layer of low density pyrolytic carbon adjacent said core and a continuous layer of higher density material exterior of said low density layer wherein the improvement comprises said core being formed of nuclear fuel selected from the group consisting of uranium oxide, thorium oxide, plutonium oxide and mixtures thereof and therefore being subject to undergo thermal migration and also being subject to undergo the loss of oxygen upon fissioning which forms CO with carbon in said surrounding low density layer and wherein particles of a substance selected from the group consisting of silicon carbide, zirconium carbide and mixtures thereof are dispersed throughout said low density pyrolytic carbon layer whereby not only is the build-up of carbon monoxide within said high density outer layer effectively counteracted but thermal migration of said core is also reduced to such an extent that the amoeba effect is no longer of consequence during normal fuel life.

2. A nuclear fuel particle in accordance with claim 1 wherein said substance is present in an amount equal to at least about one atom of silicon or zirconium for each fission that is anticipated during the expected irradiation lifetime of said fuel particle.

3. A nuclear fuel particle in accordance with claim 1 wherein said substance is silicon carbide having an average particle size of about 1000Å or less.

4. A nuclear fuel particle in accordance with claim 1 wherein substance is zirconium carbide having an average particle size of about one micron or less.

5. A nuclear fuel particle in accordance with claim 1 wherein said substance is present in an amount equal to between about 2 and about 30 weight percent based upon weight of pyrolytic carbon in said low density layer.

6. A nuclear fuel particle in accordance with claim 3 wherein said silicon carbide is present in an amount equal to between about 2 and about 30 weight percent based upon weight of pyrolytic carbon in said low density layer.

7. A nuclear fuel particle in accordance with claim 4 wherein said zirconium carbide is present in an amount equal to between about 2 and about 30 weight percent based upon weight of pyrolytic carbon in said low density layer.

8. A nuclear fuel particle having a spheroidal core of nuclear fuel material comprising uranium oxide, a surrounding layer of low density, poorly crystalline pyrolytic carbon adjacent said core having a density of not greater than 1.3 g./cm.$^3$ and a thickness between about 80 and about 120 microns, a continuous layer of higher density material exterior of said low density layer which provides a pressure-tight shell, said oxide core being subject to undergo thermal migration and to undergo the loss of oxygen upon fissioning which forms CO with carbon in said surrounding low density layer, and fine particles of zirconium carbide dispersed throughout said low density pyrolytic carbon layer, said ZrC being present in an amount equal to about 25 weight percent of said carbon in said low density layer, which fine particles effectively counteract the build-up of carbon monoxide within the high density outer layer and reduce the amoeba effect to such an extend that it is no longer of consequence during normal fuel life.

* * * * *